(12) United States Patent
Ramirez

(10) Patent No.: US 7,337,577 B1
(45) Date of Patent: Mar. 4, 2008

(54) ATTACHABLE FISHING POLE STRIKE INDICATOR

(76) Inventor: John Ramirez, 16154 Condor Cir., Weed, CA (US) 96094

( * ) Notice: Subject to any disclaimer, the term of this patent is extended or adjusted under 35 U.S.C. 154(b) by 0 days.

(21) Appl. No.: 11/623,210

(22) Filed: Jan. 15, 2007

(51) Int. Cl.
  *A01K 97/12* (2006.01)
(52) U.S. Cl. .................. 43/17; 43/17.5; 382/120; 382/191; 382/396
(58) Field of Classification Search ............ 43/17, 43/17.5; 42/114; 362/110; 248/230.4
  See application file for complete search history.

(56) References Cited

U.S. PATENT DOCUMENTS

| | | | | |
|---|---|---|---|---|
| 600,535 A | * | 3/1898 | Homan .................. 248/230.4 |
| 1,212,588 A | * | 1/1917 | Volhard ................ 248/230.4 |
| 1,220,617 A | * | 3/1917 | Evans ........................ 43/17 |
| 1,268,622 A | * | 6/1918 | Reynolds ................... 362/396 |
| 1,416,148 A | * | 5/1922 | Williams ................ 248/230.4 |
| 1,551,742 A | * | 9/1925 | Hise ........................ 43/17.5 |
| 1,752,397 A | * | 4/1930 | See ........................... 43/17 |
| 1,815,662 A | * | 7/1931 | Bacon ....................... 43/17 |
| 1,817,312 A | * | 8/1931 | Himberger ................. 43/17 |
| 1,871,240 A | * | 8/1932 | Scheller ................ 248/230.4 |
| 1,900,965 A | * | 3/1933 | Weiss ...................... 43/17.5 |
| 1,917,707 A | * | 7/1933 | Gaede et al. ................ 43/17 |
| 2,012,894 A | * | 8/1935 | Shoemaker .................. 43/6 |
| 2,102,422 A | * | 12/1937 | Lager ...................... 362/396 |
| 2,128,526 A | * | 8/1938 | Eslick ..................... 362/396 |
| 2,195,692 A | * | 4/1940 | Bushey ...................... 43/17 |
| 2,196,784 A | * | 4/1940 | Simmons et al. ............ 43/17 |
| 2,253,315 A | * | 8/1941 | Andrus ...................... 231/7 |
| 2,302,337 A | * | 11/1942 | Mantell ..................... 43/17 |
| 2,354,279 A | * | 7/1944 | Ross ........................ 43/17 |
| 2,402,877 A | * | 6/1946 | Dial ........................ 362/396 |
| 2,481,881 A | * | 9/1949 | Schneider .................. 43/17 |
| 2,530,050 A | * | 11/1950 | Evans ....................... 43/17 |
| 2,574,333 A | * | 11/1951 | Kuczynski et al. .......... 43/17 |
| 2,634,538 A | * | 4/1953 | Sader et al. ............... 43/17 |
| 2,643,371 A | * | 6/1953 | Sleeger ..................... 43/17 |
| 2,666,843 A | * | 1/1954 | Zuckerman ................ 362/120 |
| 2,671,209 A | * | 3/1954 | Backus ...................... 43/17 |
| 2,722,076 A | * | 11/1955 | Benedetti ................... 43/17 |
| 2,753,644 A | * | 7/1956 | Abel ........................ 43/17 |
| 2,775,688 A | * | 12/1956 | Golden ..................... 362/191 |
| 2,785,491 A | * | 3/1957 | Gibson ...................... 43/17 |
| 2,805,508 A | * | 9/1957 | Oldfield .................... 43/17 |
| 2,816,387 A | * | 12/1957 | Crowe et al. ............... 43/17 |
| 2,834,140 A | * | 5/1958 | Knier ....................... 43/17 |
| 2,869,275 A | * | 1/1959 | Meyer ....................... 43/17 |

(Continued)

FOREIGN PATENT DOCUMENTS

AU   9466176 A   *   1/1995

(Continued)

*Primary Examiner*—Darren W. Ark
(74) *Attorney, Agent, or Firm*—Michael I Kroll

(57) ABSTRACT

A fishing pole strike indicator comprising a housing for a power source, illuminable member and exterior switch for engaging and disengaging illumination along with a pair of clamps each with a stationary and articulated jaw member so that the strike indicator can be selectively attached to the pole as desired. Each clamp has a jaw that when closed has an aperture passing through diametrically sized to encompass a fishing pole shaft. The articulated jaw members of the clamps have a thumb screw for optionally securing the articulated jaw in the closed position and releasing the strike indicator from the fishing pole in the open position.

7 Claims, 10 Drawing Sheets

U.S. PATENT DOCUMENTS

| | | | |
|---|---|---|---|
| 2,910,797 A * | 11/1959 | Cucuro | 43/17 |
| 2,930,158 A * | 3/1960 | McQuiston | 43/17 |
| 2,931,122 A * | 4/1960 | Thordson et al. | 43/17 |
| 2,964,869 A * | 12/1960 | Berghoff et al. | 43/17 |
| 2,978,828 A * | 4/1961 | Taylor et al. | 43/17 |
| 2,986,835 A * | 6/1961 | Ordinetz et al. | 43/17 |
| 3,012,352 A * | 12/1961 | Logsdon | 43/17 |
| 3,017,499 A * | 1/1962 | Fore | 43/17.5 |
| 3,063,185 A * | 11/1962 | Digner | 43/17 |
| 3,077,693 A * | 2/1963 | Wallin | 43/11 |
| 3,091,881 A * | 6/1963 | Evans | 43/17 |
| 3,148,473 A * | 9/1964 | Miller | 43/17 |
| 3,188,767 A * | 6/1965 | Finefield | 43/17 |
| 3,199,241 A * | 8/1965 | Mauritz | 43/17 |
| 3,280,496 A * | 10/1966 | London | 43/17 |
| 3,364,610 A * | 1/1968 | Poole | 43/17 |
| 3,440,753 A * | 4/1969 | Kelley | 43/17 |
| 3,530,611 A * | 9/1970 | Britt | 43/17 |
| 3,571,536 A * | 3/1971 | Sparks | 43/17 |
| 3,696,546 A * | 10/1972 | Ambrose | 43/17 |
| 3,702,513 A * | 11/1972 | Watts | 43/17 |
| 3,740,888 A * | 6/1973 | Young, Jr. | 43/17 |
| 3,820,268 A * | 6/1974 | Newton | 43/17 |
| 3,862,509 A * | 1/1975 | Petersen, Jr. | 43/17.5 |
| 3,878,635 A * | 4/1975 | Trosper et al. | 43/17 |
| 3,881,270 A * | 5/1975 | Olcott | 43/17 |
| 3,882,629 A * | 5/1975 | Kaye | 43/17 |
| 3,918,191 A * | 11/1975 | Williamson | 43/17 |
| 3,959,910 A * | 6/1976 | Montgomery | 43/17 |
| 3,992,797 A * | 11/1976 | Kazakevich | 43/17 |
| 4,006,550 A * | 2/1977 | Rizzo | 43/17 |
| 4,023,298 A * | 5/1977 | Story | 43/17 |
| 4,026,059 A * | 5/1977 | Ochs | 43/17.5 |
| 4,051,616 A * | 10/1977 | Mathauser | 43/17 |
| 4,085,437 A * | 4/1978 | Hrdlicka et al. | 43/17.5 |
| 4,117,618 A * | 10/1978 | Utsler | 43/17.5 |
| 4,118,882 A * | 10/1978 | Gorsky | 43/17 |
| 4,133,130 A * | 1/1979 | Young, Jr. | 43/17 |
| 4,178,712 A * | 12/1979 | Williams | 43/17 |
| 4,250,649 A * | 2/1981 | Harrington et al. | 43/17 |
| 4,338,875 A * | 7/1982 | Lisowski | 248/230.4 |
| 4,369,486 A * | 1/1983 | Pool | 43/17.5 |
| 4,376,349 A * | 3/1983 | Yarczower | 43/17 |
| 4,380,883 A * | 4/1983 | Greaux | 43/17 |
| 4,390,927 A * | 6/1983 | Von Feldt | 362/396 |
| 4,417,299 A * | 11/1983 | Rupp | 43/17.5 |
| 4,479,321 A * | 10/1984 | Welstead | 43/17 |
| 4,505,063 A * | 3/1985 | Price et al. | 43/17 |
| 4,519,158 A * | 5/1985 | Kirk | 43/17 |
| 4,528,554 A * | 7/1985 | Klefbeck | 43/17 |
| 4,542,447 A * | 9/1985 | Quakenbush | 362/191 |
| 4,586,284 A * | 5/1986 | Westwood, III | 43/17 |
| 4,766,688 A * | 8/1988 | Hiles | 43/17 |
| 4,876,816 A * | 10/1989 | Triplett | 42/115 |
| D305,450 S * | 1/1990 | Noble et al. | D22/142 |
| D321,763 S * | 11/1991 | Short | 43/17 |
| 5,083,247 A * | 1/1992 | Robinson et al. | 43/17.5 |
| 5,083,249 A * | 1/1992 | Chen | 43/17.5 |
| 5,159,774 A * | 11/1992 | Bennis et al. | 43/17 |
| 5,172,508 A * | 12/1992 | Schmidt et al. | 43/17.5 |
| 5,179,797 A * | 1/1993 | Edwards et al. | 43/17.5 |
| 5,182,873 A * | 2/1993 | Aragon, Jr. | 43/17 |
| 5,205,061 A * | 4/1993 | Echols, Jr. | 43/17.5 |
| 5,228,228 A * | 7/1993 | Meissner | 43/17 |
| 5,274,943 A * | 1/1994 | Ratcliffe et al. | 43/17 |
| 5,276,990 A * | 1/1994 | Ramirez | 43/17.5 |
| 5,299,375 A * | 4/1994 | Thummel et al. | 42/115 |
| 5,471,777 A * | 12/1995 | McDonald | 362/110 |
| 5,555,667 A * | 9/1996 | Bae et al. | 43/17 |
| 5,735,073 A * | 4/1998 | Kuhlman | 43/17 |
| 5,771,624 A * | 6/1998 | Vickery et al. | 43/17 |
| 5,797,211 A * | 8/1998 | Bae et al. | 43/17 |
| 5,855,084 A * | 1/1999 | Huddleston et al. | 43/17 |
| 5,867,931 A * | 2/1999 | Morris et al. | 43/17 |
| 5,943,809 A * | 8/1999 | Ring | 43/17.5 |
| 6,000,808 A * | 12/1999 | Hansen | 43/17.5 |
| 6,035,573 A * | 3/2000 | Flores | 43/17 |
| 6,122,853 A * | 9/2000 | Genous-Moore | 43/17 |
| 6,374,533 B1 * | 4/2002 | Gonzales | 43/17 |
| 6,568,121 B1 * | 5/2003 | Gonzales | 43/17 |
| 6,715,229 B2 * | 4/2004 | Chu | 43/17.5 |
| 6,908,216 B2 * | 6/2005 | Love | 362/253 |
| 7,040,052 B1 * | 5/2006 | Paulk | 43/17 |
| 7,100,323 B1 * | 9/2006 | Bogess | 43/17.5 |
| 7,147,194 B2 * | 12/2006 | Rivers et al. | 248/317 |
| 2006/0075675 A1 * | 4/2006 | Goretti et al. | 43/17 |

FOREIGN PATENT DOCUMENTS

| | | | |
|---|---|---|---|
| DE | 2342320 A * | 2/1975 | |
| DE | 3200728 A1 * | 7/1983 | |
| DE | 3503670 A1 * | 8/1986 | |
| DE | 3824381 A1 * | 1/1990 | |
| DE | 4110782 A1 * | 5/1992 | |
| EP | 1269839 A2 * | 1/2003 | |
| EP | 1382242 A1 * | 1/2004 | |
| FR | 2216912 A * | 10/1974 | |
| FR | 2312826 A * | 1/1977 | |
| GB | 2346530 A * | 8/2000 | |
| JP | 04053437 A * | 2/1992 | |
| JP | 5-503213 A * | 6/1993 | |
| JP | 07039288 A * | 2/1995 | |
| JP | 08275705 A * | 10/1996 | |
| JP | 10113111 A * | 5/1998 | |
| JP | 2001204341 A * | 7/2001 | |
| JP | 2002306041 A * | 10/2002 | |
| JP | 2003070401 A * | 3/2003 | |
| JP | 2003250412 A * | 9/2003 | |
| JP | 2004166680 A * | 6/2004 | |
| JP | 2006121941 A * | 5/2006 | |
| WO | WO 00/76311 A1 * | 12/2000 | |
| WO | WO 00/78134 A1 * | 12/2000 | |

\* cited by examiner

ATTACHABLE FISHING POLE STRIKE INDICATOR

BACKGROUND OF THE INVENTION

1. Field of the Invention

The present invention relates generally to sports equipment and, more specifically, to a fishing pole strike indicator. The strike indicator has a housing, a power source, an illuminable member and an exterior switch for engaging and disengaging power to the illuminable member to selectively provide illumination.

Also disposed on the exterior housing are a pair of clamps each with a stationary and articulated jaw member so that the strike indicator can be selectively attached to the pole as desired. Each clamp has a jaw that when closed has an aperture passing through diametrically sized to encompass a fishing pole shaft. The articulated jaw members of the clamps have a thumb screw for optionally securing the articulated jaw in the closed position and releasing the strike indicator from the fishing pole in the open position.

Once illuminated the portable light casts a beam which is visible from a considerable distance. Should the portable light have a typical collar around the lens then the illuminated collar also serves as the strike indicator. Simply stated, once attached to the pole and energized, movement of the light indicates a strike.

2. Description of the Prior Art

There are other strike indicators designed for fishing poles. Typical of these is U.S. Pat. No. 1,752,397 issued to See on Apr. 1, 1930.

Another patent was issued to Shoemaker on Aug. 27, 1935 as U.S. Pat. No. 2,012,894. Yet another U.S. Pat. No. 3,017,499 was issued to Fore on Jan. 16, 1962 and still yet another was issued on Mar. 23, 1971 to Sparks as U.S. Pat. No. 3,571,536.

Another patent was issued to Welstead on Oct. 30, 1984 as U.S. Pat. No. 4,479,321. Yet another U.S. Pat. No. 5,179,797 was issued to Edwards, et al. on Jan. 19, 1993. Another was issued to Ring on Aug. 31, 1999 as U.S. Pat. No. 5,943,809 and still yet another was issued on Dec. 14, 1999 to Hansen as U.S. Pat. No. 6,000,808.

Another patent was issued to Gonzales on Apr. 23, 2002 as U.S. Pat. No. 6,374,533. Yet another U.S. Pat. No. 7,040,052 was issued to Paulk on May 9, 2006.

U.S. Pat. No. 1,752,397

Inventor: Cyrus V. See

Issued: Apr. 1, 1930

A fishing device comprising a pole, a metal contact member carried by the end of the pole, and a spring pressed contact ring receiving the contact member and normally held in spaced relation by said spring, and a fishing line extended through said ring.

U.S. Pat. No. 2,012,894

Inventor: George E. Shoemaker

Issued: Aug. 27, 1935

In a catching pole of the class described a lamp intermediate its ends to illuminate the catching end of the pole, means carried by the pole to energize the lamp, said lamp and means being embodied in a unit forming one section of the pole, a spur on one end of the unit, a butt section attachable to the spur, and pole sections attachable to the other end of the unit.

U.S. Pat. No. 3,017,499

Inventor: Beaser G. Fore

Issued: Jan. 16, 1962

A fishing rod comprising a tubular shaft having a butt end and a tip end, said shaft being provided with a coating of phosphorescent paint, fishline guides carried by the shaft, a tubular reel holder comprising an after end, an intermediate reel mount portion and a forward end, said forward end being releasably affixed to the butt end of the shaft, a hollow handle releasably affixed to the after end of the reel holder, said tubular reel holder and tubular shaft forming an electric conduit extending from the handle to the tip end, and manually controllable means illuminating said shaft coating including an electric light mounted at the tip end of the shaft, a battery within the hollow handle, and means releasably electrically connecting the battery to the light including a switch on the handle and electric conductors in the conduit.

U.S. Pat. No. 3,571,536

Inventor: Virgil H. Sparks

Issued: Mar. 23, 1971

A flashlight is equipped with circuit make and break means so constructed and cooperatively oriented with the coacting battery case that when a fish bites, the pull which is exerted acts on the movable contact, in a manner to (1) close the circuit (2) bring the signal light into play and (3) alert the fisherman. Several similar but structurally distinct circuit make and break adaptations are herein disclosed. Means is provided for mounting the flashlight on a rod, a pole, or where a trotline is used, on a vertical stake. The light bulb is provided with novel inner and outer caps, the outer cap being provided with distinguishably and selectively usable colored segments, that is, where a plurality of individual bite signals are grouped adjacent each other.

U.S. Pat. No. 4,479,321

Inventor: Robert F. Welstead

Issued: Oct. 30, 1984

A night fishing signaling device includes an elongated battery housing adapted to be mounted on a fishing rod adjacent the free end opposite the handle. An electrically actuated light source is mounted on the housing and electrically connected to the battery by an electrical circuit which includes a gravity actuated switch operative to make and break the electrical connection between the battery and light source in response to rotational movements of the free end of the fishing rod.

U.S. Pat. No. 5,179,797

Inventor: John J. Edwards

Issued: Jan. 19, 1993

A night fishing tip light for a fishing rod has a battery holder and a pair of wires that extend to an LED. One pair of Velcro straps affixed to the battery holder back attach the holder to the rod handle and a second pair mate to hold the power cells in the holder. The LED and the wire conductors are mounted by cable ties onto the side of the rod away from the fishing line.

U.S. Pat. No. 5,943,809

Inventor: Ronald W. Ring

Issued: Aug. 31, 1999

A fishing pole with light source that includes an internally wired fishing rod assembly and a detachable, aimable light source. The fishing rod assembly includes a flexible elongated rod portion that is attached to a handle portion. The handle portion includes a battery connector positioned within a battery compartment formed therein. The rod portion has a pair of conducting wires running within the length thereof that are electrically connected at a first end with the battery connector of the handle portion and at a second end thereof to two electrical contact plates positioned at the tip end of the rod portion. The detachable, aimable light source includes a combination securing clip/electrical connector, a swivel assembly, and an aimable light assembly; the combination securing clip/electrical connector including a pair of opposed gripping jaws that define a gripping channel that is partially defined by two electrically separated securing clip electrical contact areas. The swivel assembly is in connection between the combination securing clip/electrical connector and the aimable light assembly. The aimable light assembly includes a light assembly housing, a light bulb, a rotatable focusing lens assembly, and two electrical wires forming an electrical connection between the two securing clip electrical contact areas and the light bulb.

U.S. Pat. No. 6,000,808

Inventor: Jeffrey T. Hansen

Issued: Dec. 14, 1999

The disclosed optionally lighted fishing pole has a portable source of light held relative to the pole proximate its handle, with an operable on-off switch. A continuous light-transmitting element is extended axially along the pole body from the handle toward the pole tip. The light source has reflective and lens structures directing light axially into the light-transmitting element proximate the handle for transmission along the length of the element and illumination of the exterior circumferential surface of the element. The illuminated exterior circumferential surface of the lighted light-transmitting element is visible from lateral proximity of the fishing pole, for improved fishing during darkness. The light-transmitting element can be mounted externally of the pole body, or internally of a hollow pole body that is also formed of transparent or translucent material.

U.S. Pat. No. 6,374,533

Inventor: Daniel L. Gonzales

Issued: Apr. 23, 2002

A fish bite indicating apparatus for alerting a user of a fish bite. The fish bite indicating apparatus includes a fishing rod. The fishing rod has a pole portion and a handle portion. A capsule has dimensions adapted to fit in the handle portion. The capsule has a first end and a second end. The first end has a light bulb therein. The capsule has a power source therein for powering the light bulb. An actuating means turns on the light bulb. The actuating means is mounted in the handle portion. A saddle has a top portion and a bottom portion. The bottom portion has an annular groove therein. The top portion has a cavity therein. The cavity has a pin mounted therein, and the pin has a longitudinal axis is orientated generally parallel to an axis of the annular groove. A trigger for sliding on the pin is slidably mounted on the pin. A tension line connects the actuating means to the trigger.

U.S. Pat. No. 7,040,052

Inventor: Ricky Paulk

Issued: May 9, 2006

A fishing pole bite alarm system, including a pager and a fishing pole having a handle, a mast, a plurality of fixed eyelets on the mast including a distal fixed eyelet, and a movable eyelet assembly hinged to the distal fixed eyelet. A fishing line extends through the fixed eyelets and through the movable eyelet assembly. A tension switch is located within the pole and is attached to the movable eyelet assembly by a control wire. When the fishing line is tensioned, the movable eyelet is pivoted, pulling the control wire in order to activate the tension switch. The tension switch activates a pole light that illuminates the mast and signals the pager to generate and audible alert.

While these strike indicators may be suitable for the purposes for which they were designed, they would not be as suitable for the purposes of the present invention, as hereinafter described.

SUMMARY OF THE PRESENT INVENTION

A primary object of the present invention is to provide a strike indicator for a fishing pole.

Another object of the present invention is to provide a strike indicator that is easily attachable to and detachable from a fishing pole.

Yet another object of the present invention is to provide a strike indicator comprising a housing having a power source, illuminable element and switch means for engaging and disengaging illumination.

Still yet another object of the present invention is to provide a strike indicator having a pair of clamps to easily attach to and detach from the strike indicator.

Another object of the present invention is to provide the strike indicator clamps with a stationary jaw and an articulated jaw.

Yet another object of the present invention is to provide the articulated jaw with a fastener for selectively securing the jaw in a desired position.

Still yet another object of the present invention is to provide a strike indicator that when attached to a fishing pole and illuminated provides means for indicating a strike when the light moves.

Additional objects of the present invention will appear as the description proceeds.

The present invention overcomes the shortcomings of the prior art by providing a fishing pole strike indicator comprising a housing for a power source, illuminable member and exterior switch for engaging and disengaging illumination along with a pair of clamps each with a stationary and articulated jaw member so that the strike indicator can be selectively attached to the pole as desired. Each clamp has a jaw that when closed has an aperture passing through diametrically sized to encompass a fishing pole shaft. The articulated jaw members of the clamps have a thumb screw for optionally securing the articulated jaw in the closed position and releasing the strike indicator from the fishing pole in the open position.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
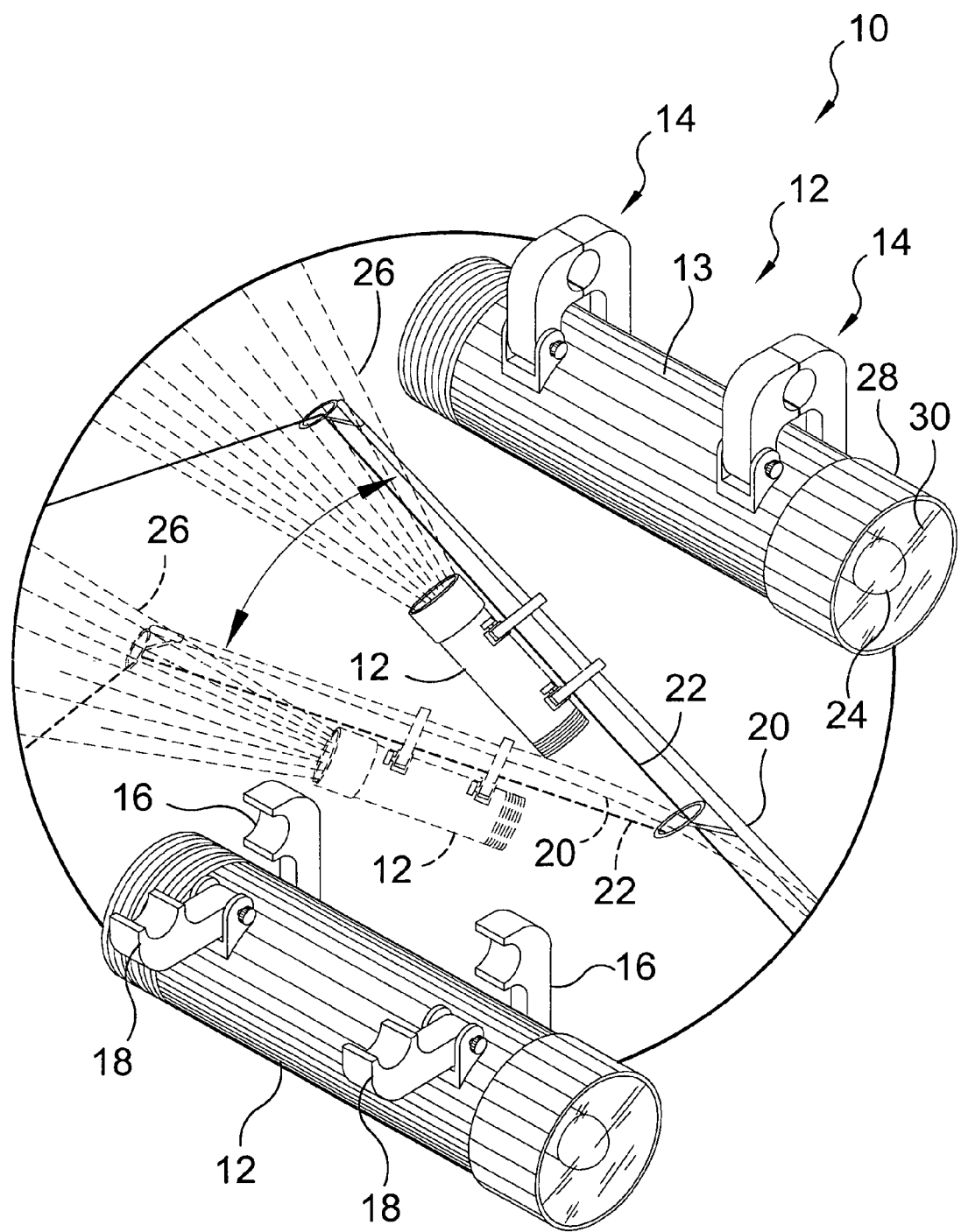
FIG. 1 is an illustrative view of the strike indicator of the present invention.

Turning now descriptively to the drawings, in which similar reference characters denote similar elements throughout the several views, the figures illustrate the Attachable Fishing Pole Strike Indicator of the present invention. With regard to the reference numerals used, the following numbering is used throughout the various drawing figures.

10 Attachable Fishing Pole Strike Indicator of the present invention
12 strike indicator
13 housing of 12
14 securing clamps
16 stationary jaw member
18 articulating jaw member
20 fishing rod
22 fishing line
24 illuminable element
26 light beam
28 lens collar
30 lens
32 power switch
34 aperture of 14
36 locking base
38 thumb wheel lock
40 fishing line gap
42 battery
44 first flange of 36
46 second flange of 36
48 recess of 44
50 treaded recess of 46
52 articulating recess

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the strike indicator 12 of the present invention 10. The present invention 10 is a device and method of indicating a fish strike on a pre-casted fishing pole 20 and line 22 wherein a portable, illuminable strike indicator 12 comprises an illuminable member 24 disposed within a housing 13 having a pair of clamps 14 each with a stationary jaw member 16 and an articulated jaw member 18 allowing the strike indicator 12 to be selectively attached to the pole 20 as desired. Once illuminated, the illuminable member 24 casts a beam 26 which is visible from a considerable distance. Should the light source 24 have a typical collar 28 around the lens 30 then the illuminated collar 28 also serves as the strike indicator. Simply stated, once attached to the pole 20 and energized, movement of the light beam 26 indicates a strike.

Figure 2:
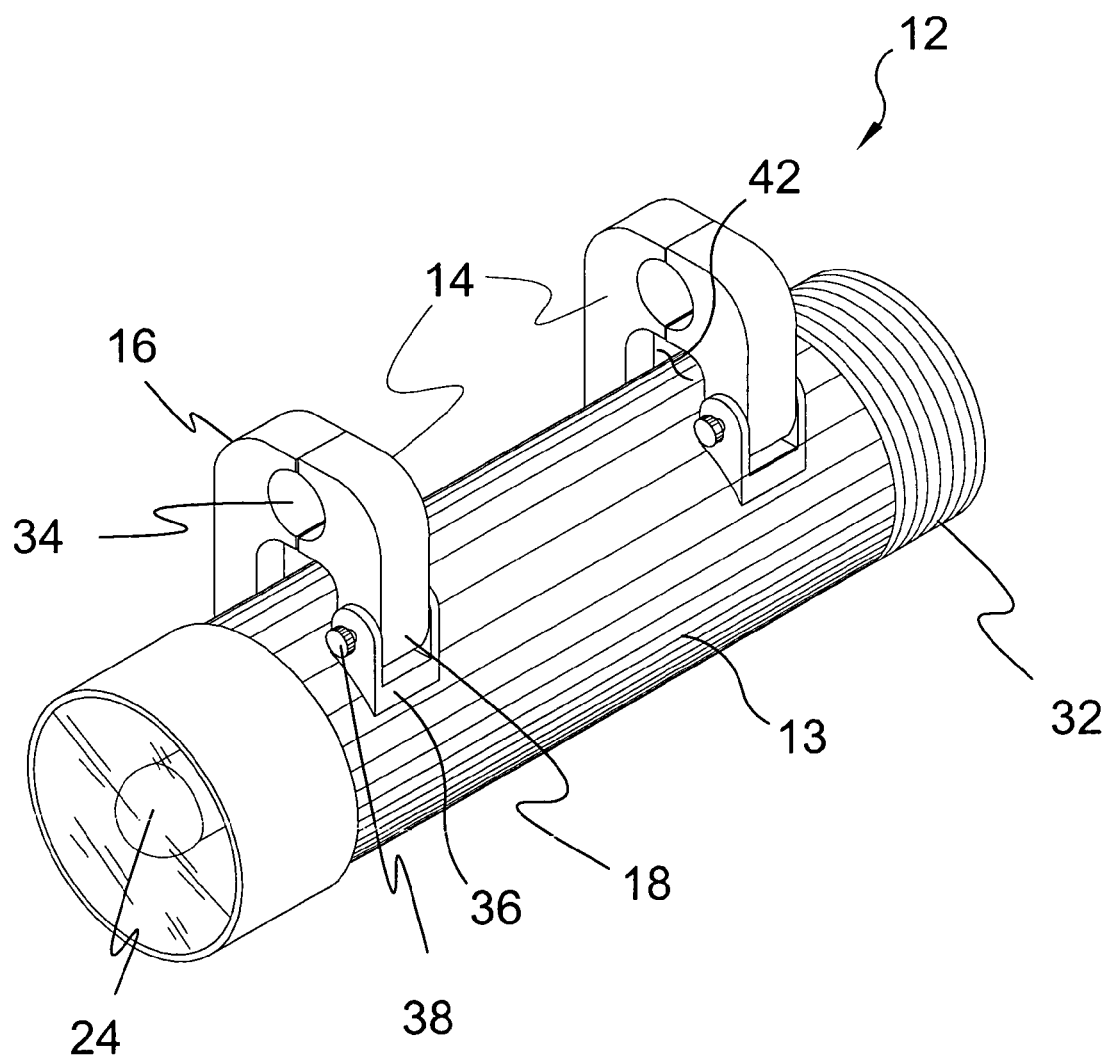
FIG. 2 is a perspective view of the strike indicator.

FIG. 2 is a perspective view of the strike indicator 12. Shown is the strike indicator 12 having a housing 13 for a power source, an illuminable member 24 (depicted here as an LED) and an exterior power switch 32 for engaging and disengaging illumination. Also disposed on the exterior housing are a pair of securing clamps 14, each having an articulating jaw 18 that when closed and engaged with the stationary jaw 16 forms an aperture 34 diametrically sized to encompass a fishing pole shaft. The articulating member 18 of the clamp 14 is pivotally secured to the housing 13 via a base 36 and has a thumb screw 38 for optionally securing the articulating member 18 in the closed position when in use and releasing the strike indicator 12 from the fishing pole as needed. A fishing line gap 40 is provided subjacent to the fishing pole aperture 34 between the mating jaw members 16, 18 and the housing 13.

Figure 3:
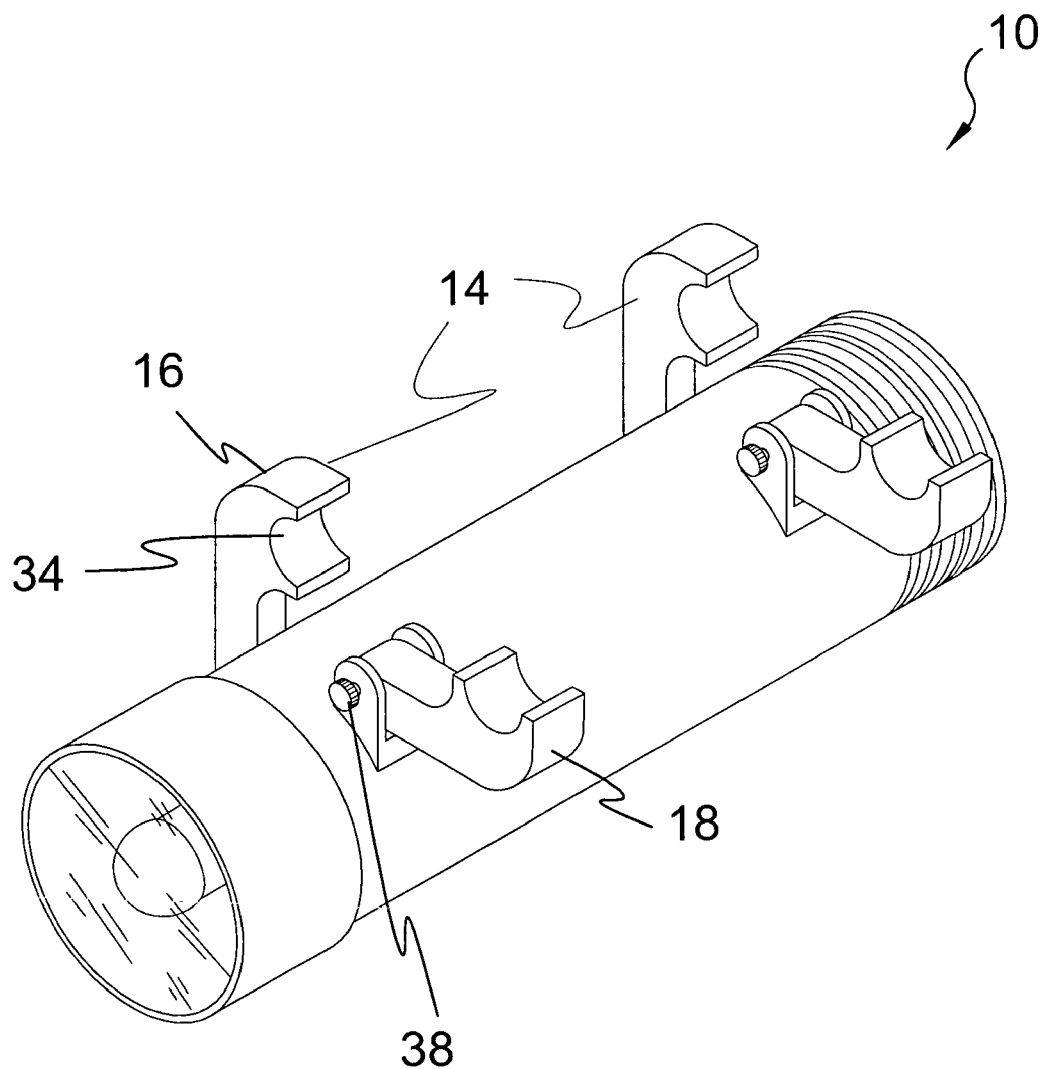
FIG. 3 is a perspective view of the strike indicator articulated jaw in an open position.

FIG. 3 is a perspective view of the strike indicator 12 articulated jaws 18 in an open position. The thumb wheel lock 38 has been loosened to enable the articulating jaw 18 to pivot freely thus enabling the user to position the aperture 34 of the stationary jaw 16 against the fishing rod with the fishing line underneath prior to closing the articulating jaw 18 and securing the device in place with the thumb wheel 38. The process is simply reversed to release the clamps 14 and remove the strike indicator 12 from the rod.

Figure 4:
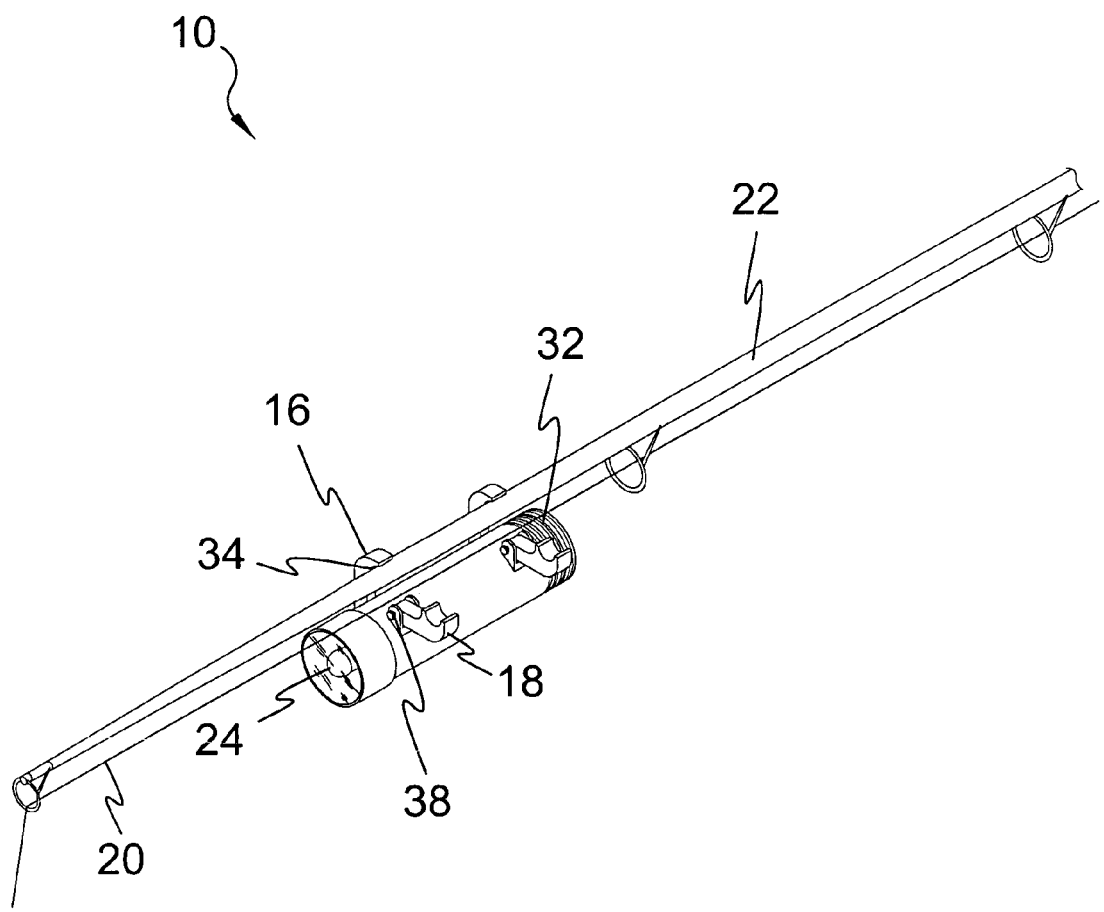
FIG. 4 is an illustrative view of the present invention in use.

FIG. 4 is an illustrative view of the present invention 10 in use. Shown is the strike indicator 12 about to be clamped to a fishing rod 20. The thumb wheel lock 38 has been loosened to enable the articulating jaw 18 to pivot freely thus enabling the user to position the aperture 34 of the stationary jaw 16 against the fishing rod 20 with the fishing line 22 underneath prior to closing the articulating jaw 18 and securing the device in place with the thumb wheel 38. When a user casts out the fishing line 22, the strike indicator 12 is clamped to the tip area of the fishing pole 20 and the switch 32 is turned to the on position to send power and activate the illuminable element 24. When a strike occurs, the pole 20 tip is tugged up and down along with the turned on light beam indicating a strike that is easily noticed from a distance in the dark.

Figure 5:
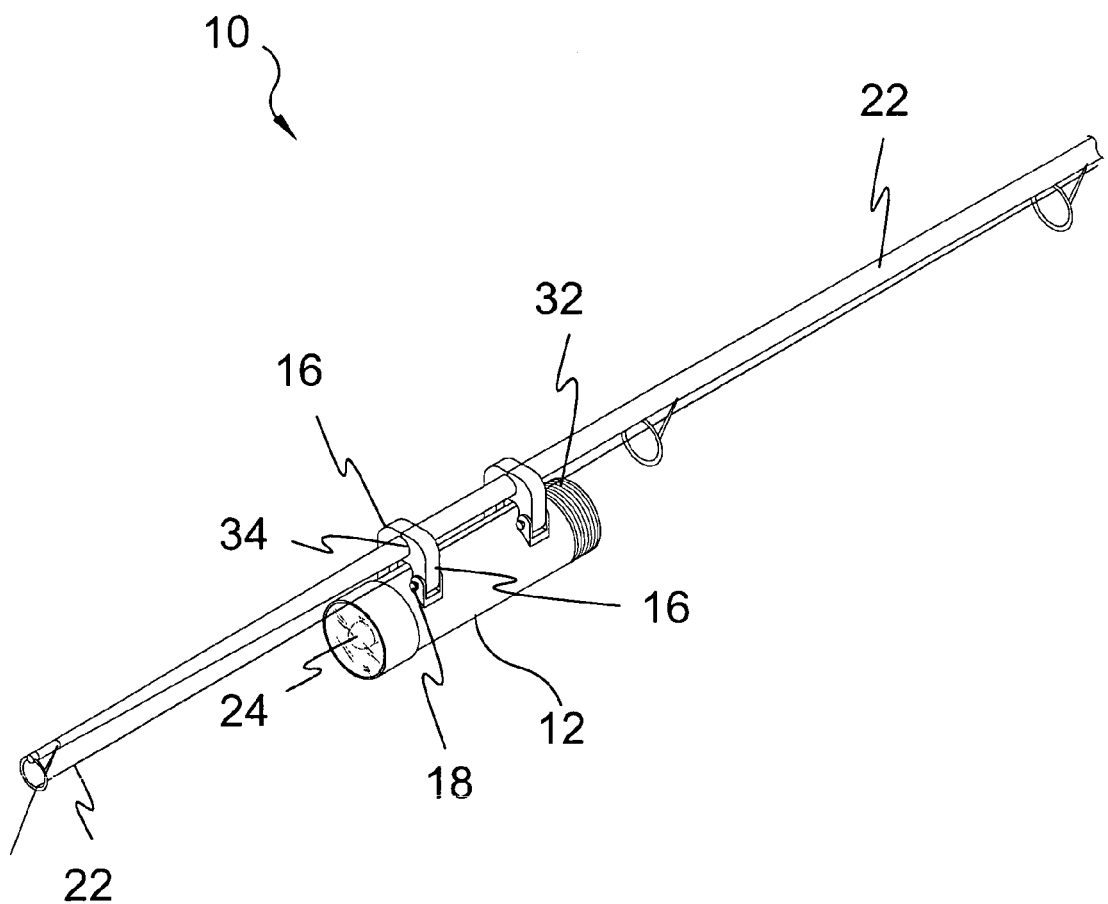
FIG. 5 is an illustrative view of the present invention in use.

FIG. 5 is an illustrative view of the present invention 10 in use. Shown is the present invention clamped to a fishing rod tip area. Shown is the strike indicator 12 clamped to a fishing rod 20. The thumb wheel lock 38 has been tightened to secure the articulating jaw 18 against the stationary jaw 16 with the fishing rod 20 firmly ensconced within the aperture 34. When a user casts out the fishing line 22, the strike indicator 12 is clamped to the tip area of the fishing pole 20 and the switch 32 is turned to the on position to send power and activate the illuminable element 24. When a strike occurs, the pole 20 tip is tugged up and down along with the turned on light beam indicating a strike that is easily noticed from a distance in the dark. The device may be made with or without a lens cover and a different clamp assembly may be employed.

Figure 6:
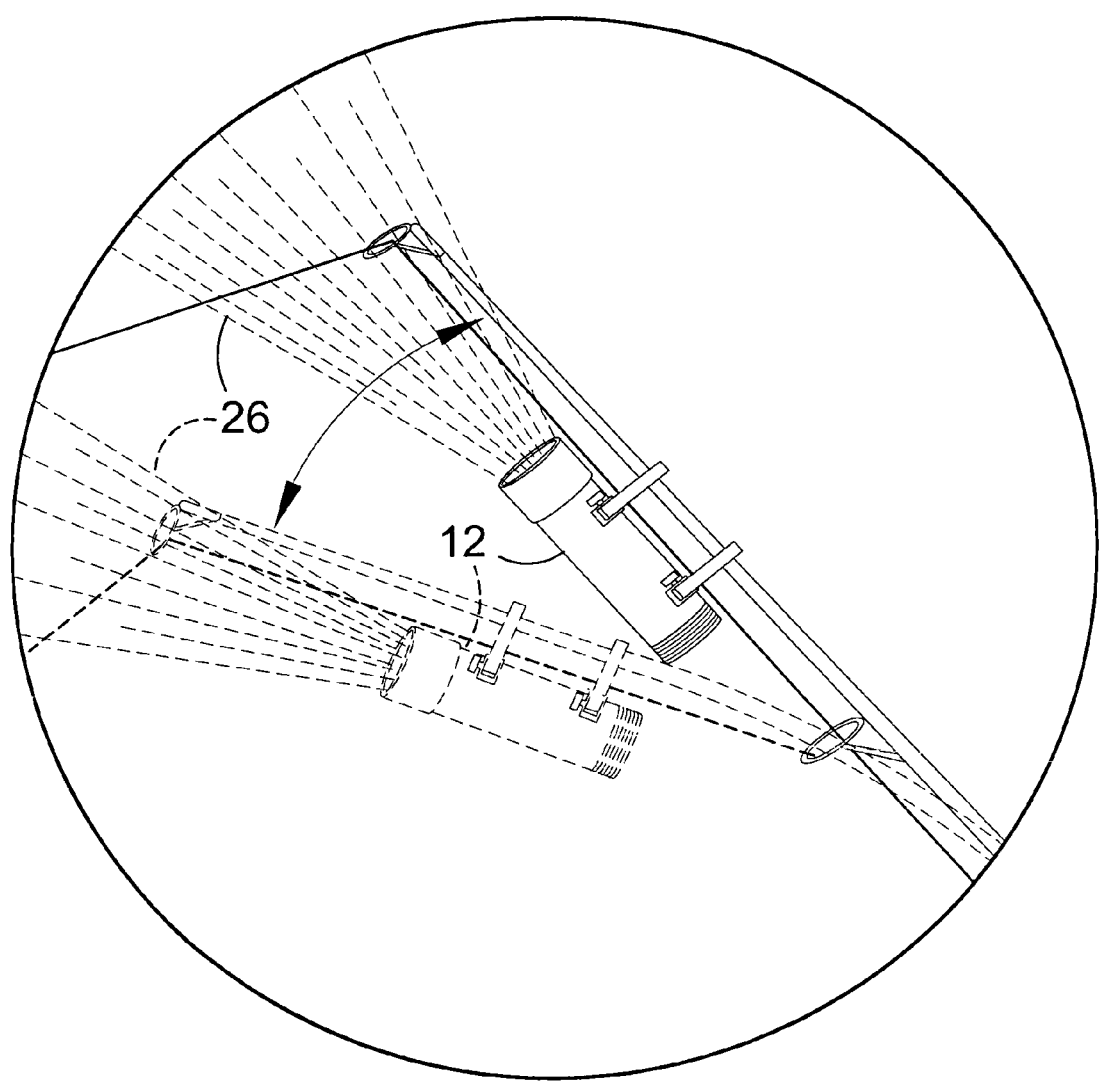
FIG. 6 is an illustrative view of the strike indicator in use.

FIG. 6 is an illustrative view of the strike indicator 12 in use during a strike. Once illuminated the strike indicator 12 casts a beam 26 which is visible from a distance. Movement of the beam 26 indicates a strike.

Figure 7:
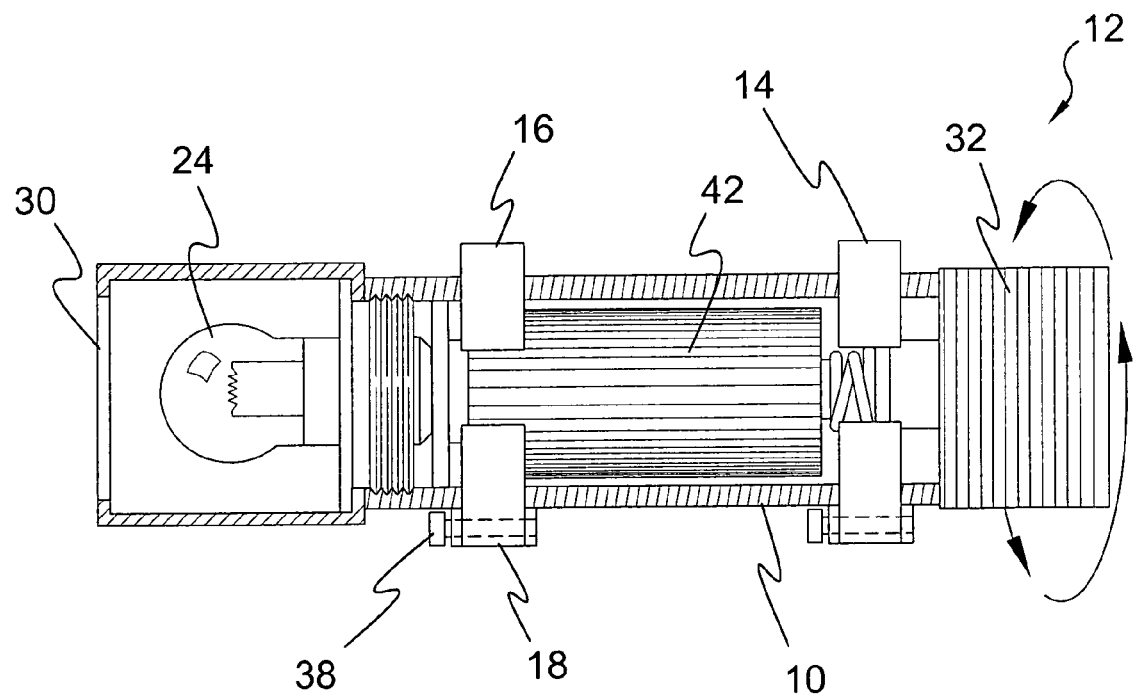
FIG. 7 is a sectional view of the strike indicator.

FIG. 7 is a sectional view of the strike indicator 12. Enclosed within the strike indicator housing 13 are a power source, such as one or more batteries, and an illuminable element 24, such as an led. An exterior switch 32 is disposed on the end of the housing 13 opposing the illuminable element 24 for engaging and disengaging illumination. Extending from the exterior surface of the housing 13 is a pair of spaced apart securing clamps. 14. Closing the articulating jaw 18 to engage the stationary jaw 16 forms an aperture passing through diametrically sized to encompass a fishing pole shaft. The articulating jaws 18 of the clamps 14 have a thumb screw 38 for securing the articulated member 18 in a desired position. The strike indicator 12 may be made with or without a lens cover and may employ a different clamp assembly.

Figure 8:
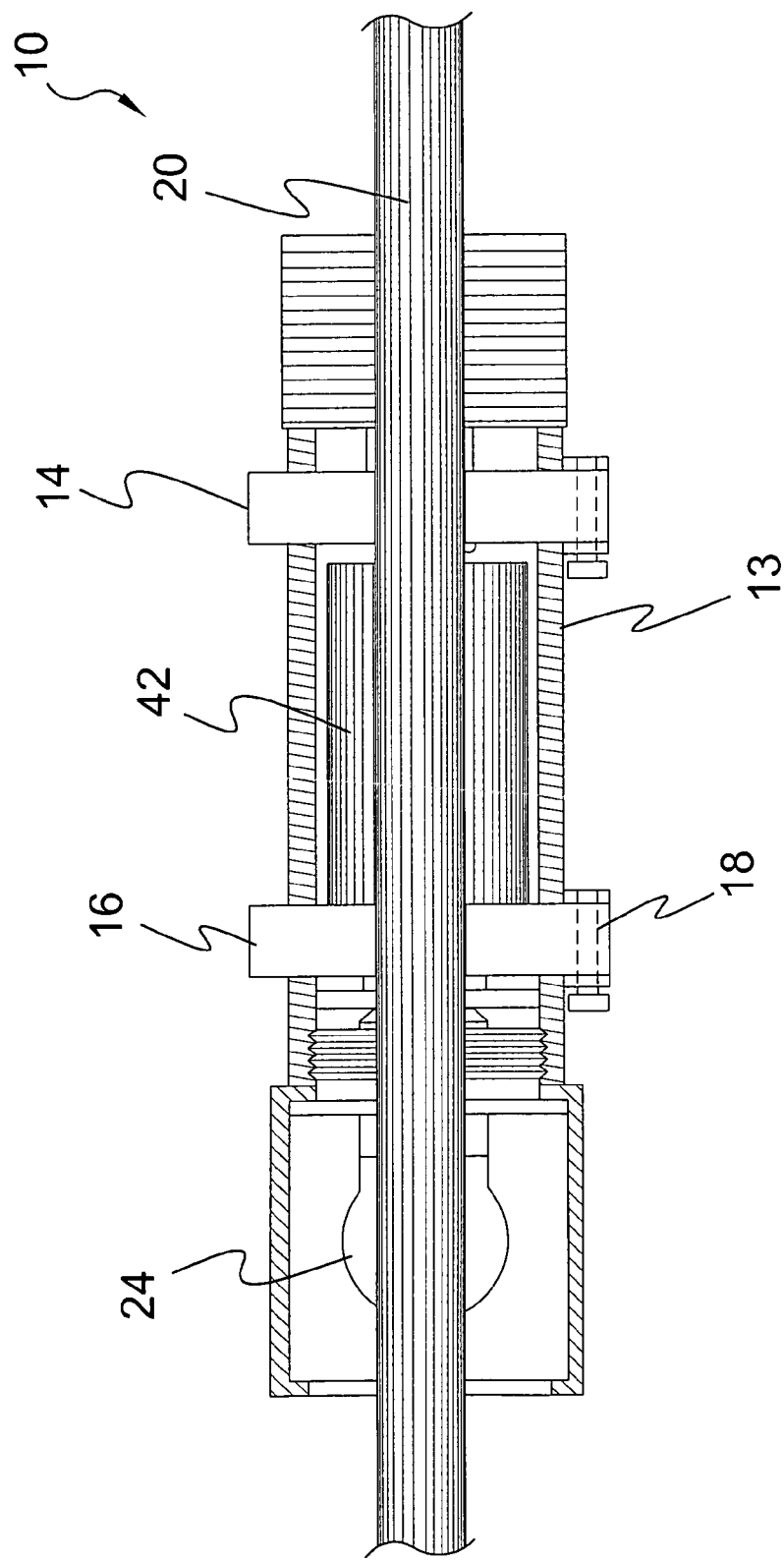
FIG. 8 is a top sectional view of the present invention.

FIG. 8 is a top sectional view of the present invention 10. Shown is the strike indicator 12 clamped to a fishing rod 20 tip area. The device has a cylindrical light housing 13 and battery 42 operated led 24 with stationary jaws 16 and articulated jaws 18 comprising a pair of clamps 14 attached thereto. When a user casts out the fishing line, the device is clamped to the tip area of the fishing pole 20. When a strike occurs, the pole 20 tip is tugged up and down along with the light beam indicating a strike.

Figure 9:
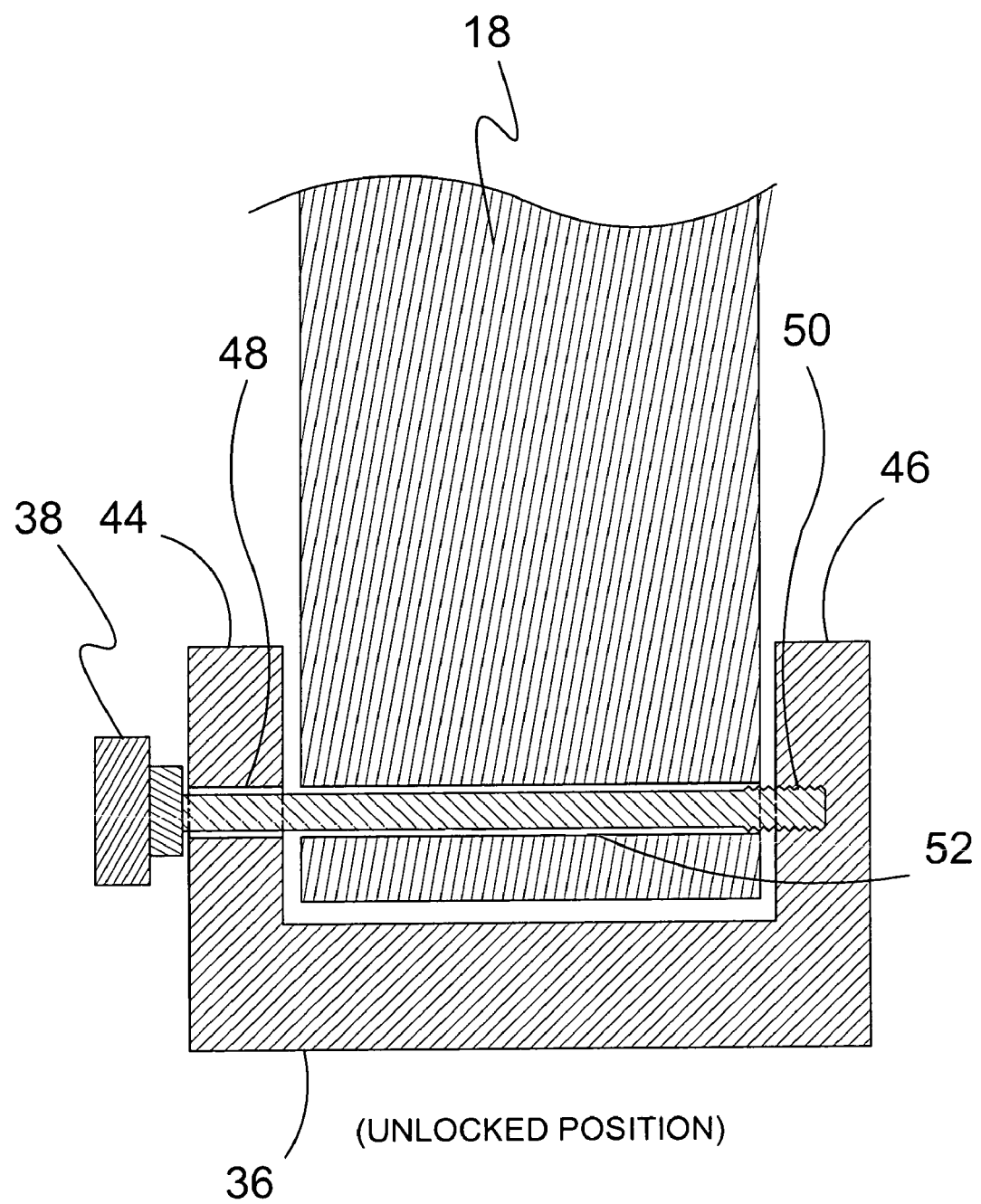
FIG. 9 is a sectional view of the articulated jaw of the strike indicator open.

FIG. 9 is a sectional view of the articulated jaw 18 of the strike indicator in an unlocked state. The articulated jaw 18 is pivotally secured to the housing via a locking base 36 having a pair of resilient flanges 44, 46 extending perpendicularly therefrom. The bottom of the articulating jaw 18 resides between the two flanges 44,46 and the thumbscrew 38 passes freely through a recess 48 in the first flange 44, through an articulating recess 52 in the articulating jaw 18 and is threaded into a threaded recess 50 in the second flange 46. Shown is the thumb wheel lock 38 untightened thereby enabling the articulating jaw 18 to pivot freely.

Figure 10:
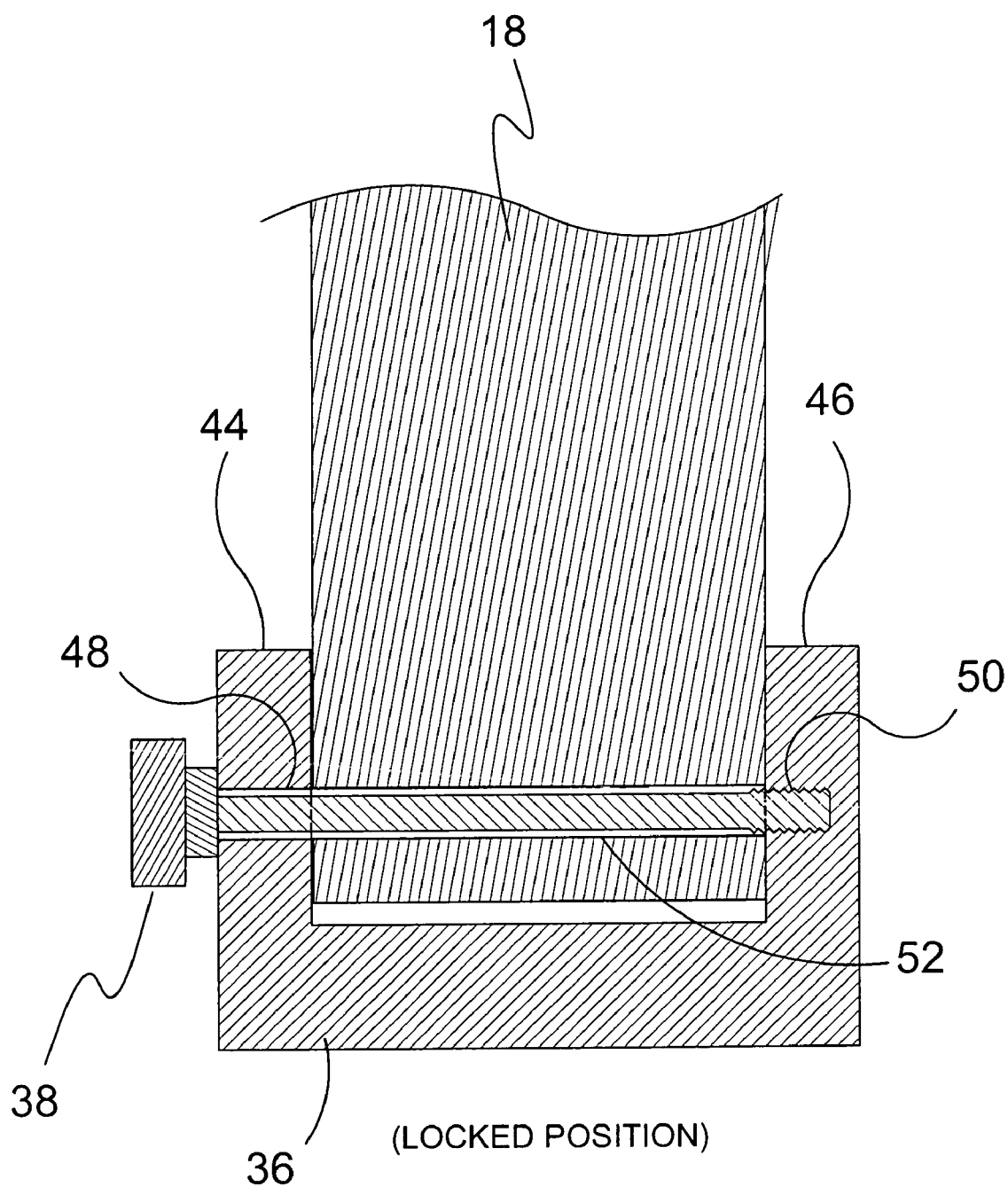
FIG. 10 is a sectional view of the articulated jaw of the strike indicator closed.

FIG. 10 is a sectional view of the articulated jaw 18 of the strike indicator in a locked position. The thumbscrew 38 has been tightened thereby drawing the two flanges 44, 46 together to frictionally engage the articulating jaw 18 and restrict further movement thereof until the thumbscrew 38 is loosened by the user.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A light emitting strike indicator device that is placed on a tip of a fishing rod after a fishing line has been cast and the rod set that enables the user to recognize in the dark that the line has a strike due to the resultant movement of the light, said strike indicator comprising:
   a) a substantially cylindrical housing;
   b) an illuminable element disposed within an end of said housing;
   c) a power source in electrical communication with said illuminable element;
   d) an externally disposed power switch to allow the user to selectively enable and disable power to said illuminable element; and
   e) a pair of clamps for securing said housing near the tip of a fishing rod with said illuminable element oriented towards said tip and without obstructing travel of the fishing line once the line has been struck, each securing clamp comprising a stationary jaw and an opposing articulating jaw wherein said articulating jaw pivots to mate with said stationary jaw for attachment to said fishing rod and pivots away for disengagement thereof, said stationary and articulating jaws each having a proximal and a distal end, said distal ends of said stationary jaw and said articulating jaw having projections which project medially towards the opposing jaw with said projections having semicircular cutouts forming a cylindrical aperture parallel with said housing when the projections of said stationary jaw and the projections of said articulating jaw mate with one another, said aperture having a circumference substantially equal to that of the tapered end of a fishing rod, said articulating jaw being pivotally secured to said housing at said proximal end thereof via a flanged base member and a locking hinge means, said flanged base member having a first flange with a recess extending therethrough and a second flange with a medially disposed threaded recess therein, said proximal end of said articulating jaw defining a bottom portion of the articulating jaw which includes an articulating recess extending therethrough that is alignable with said recess of said first flange and said threaded recess of said second flange, said bottom portion of said articulating jaw being disposed between said first flange and said second flange, and wherein said locking hinge means is a thumbscrew lock with a screw portion extending freely through said recess of said first flange, through said articulating recess and being threaded into said threaded recess of said second flange.

2. The strike indicator device recited in claim 1, wherein said power source is at least one battery disposed within said housing.

3. The strike indicator device recited in claim 1, wherein said illuminable element is an LED.

4. The strike indicator device recited in claim 1, wherein said flanges are resilient.

5. The strike indicator device recited in claim 1, wherein a gap is provided between the housing and the lower mating surface of said jaws to accommodate the fishing line.

6. The strike indicator device recited in claim 5, wherein said strike indicator device is installed in the following sequence:
   a) casting the fishing line;
   b) anchoring the fishing rod;
   c) fully opening said articulating jaws;
   d) aligning said apertures of said stationary jaws with the shaft of said fishing rod towards the tip thereof; and
   e) closing said articulating jaws and securing them in place by turning said thumbscrews thereby drawing said resilient flanges together to frictionally engage said articulating jaws and thus forming a secure effective clamp.

7. The strike indicator device recited in claim 6, wherein removal of said strike indicator device from said fishing rod is accomplished by reversing steps c through e of claim 6.

* * * * *